(12) United States Patent
Kuo

(10) Patent No.: US 6,325,517 B1
(45) Date of Patent: Dec. 4, 2001

(54) REAR VISION MIRROR WITH COLD LIGHT DIRECTION SIGNAL INDICATOR

(76) Inventor: Su Chang Kuo, 8-2 Fl, No. 2, Lane 222, Min Tsu Rd., Panchiao City, Taipei Hsien (TW)

( * ) Notice: Subject to any disclaimer, the term of this patent is extended or adjusted under 35 U.S.C. 154(b) by 0 days.

(21) Appl. No.: 09/501,983

(22) Filed: Feb. 11, 2000

(51) Int. Cl.[7] .................................. B60R 1/06; B60R 1/12
(52) U.S. Cl. ...................... 359/838; 362/559; 362/560; 362/494; 340/475
(58) Field of Search ...................... 362/559, 560, 362/494, 551, 555; 340/468, 475; 359/838

(56) References Cited

U.S. PATENT DOCUMENTS

| | | | |
|---|---|---|---|
| 4,821,019 | * | 4/1989 | Taylor . |
| 5,303,130 | * | 4/1994 | Wei et al. ............................. 362/494 |
| 5,499,169 | * | 3/1996 | Chen ................................... 362/494 |
| 5,671,996 | * | 9/1997 | Bos et al. . |
| 5,774,283 | * | 6/1998 | Nagel et al. ......................... 359/838 |
| 5,805,367 | * | 9/1998 | Kanazawa ............................ 359/868 |
| 5,823,654 | * | 10/1998 | Pastrick et al. ...................... 362/494 |
| 6,099,153 | * | 8/2000 | Zimmermann et al. ............. 362/494 |
| 6,139,171 | * | 10/2000 | Waldman .............................. 362/494 |
| 6,152,587 | * | 11/2000 | Berg ..................................... 362/494 |
| 6,152,590 | * | 11/2000 | Furst et al. ........................... 362/494 |
| 6,227,689 | * | 5/2001 | Miller ................................... 362/494 |

FOREIGN PATENT DOCUMENTS

| | | | | |
|---|---|---|---|---|
| 402225147A | * | 9/1990 | (JP) | ..................................... 362/494 |
| 10-297362-A | * | 11/1998 | (JP) | . |
| 11-165590-A | * | 6/1999 | (JP) | . |

* cited by examiner

Primary Examiner—Cassandra Spyrou
Assistant Examiner—John Juba, Jr.
(74) Attorney, Agent, or Firm—Rosenberg, Klein & Lee

(57) ABSTRACT

A rear vision mirror with a cold light direction indicator includes a rear vision mirror, a cold light direction indicator and a protecting cover. The rear vision mirror is a case with a reflector and is firmly secured to a proper position on a car. The cold light direction indicator is a case with a reflector, and is firmly secured to a surface of the case of the rear vision mirror, and is electrically connected to a power source and control device. The protecting cover covers on a surface of the case of the rear vision mirror, and the cold light direction indicator therewithin can expose out of the cover from a via hole. Therefore, an action of the cold light direction indicator can be viewed in a horizontal direction by drivers at front, lateral, or lateral rear sides, light from the cold light direction indicator is soft and almost no power is consumed. No flash light affecting human eyes emits.

12 Claims, 12 Drawing Sheets

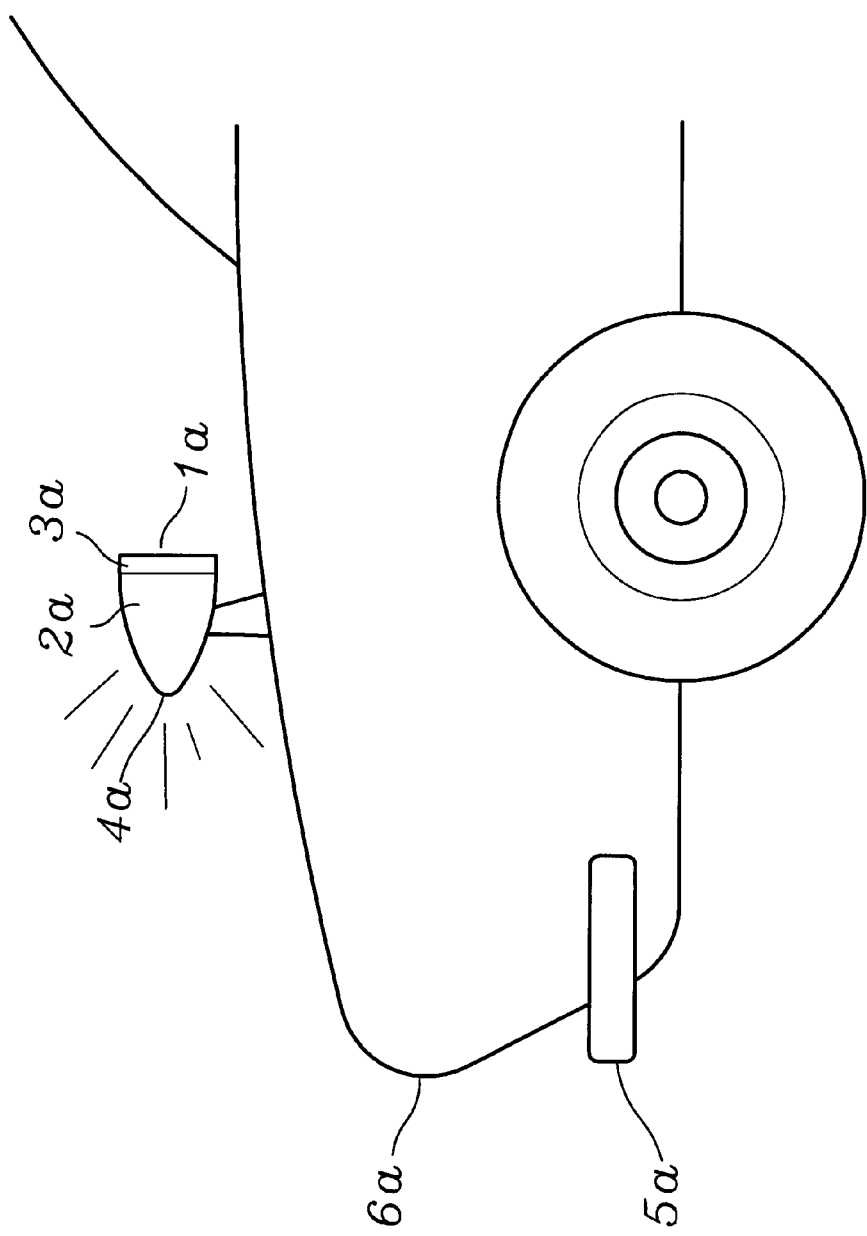

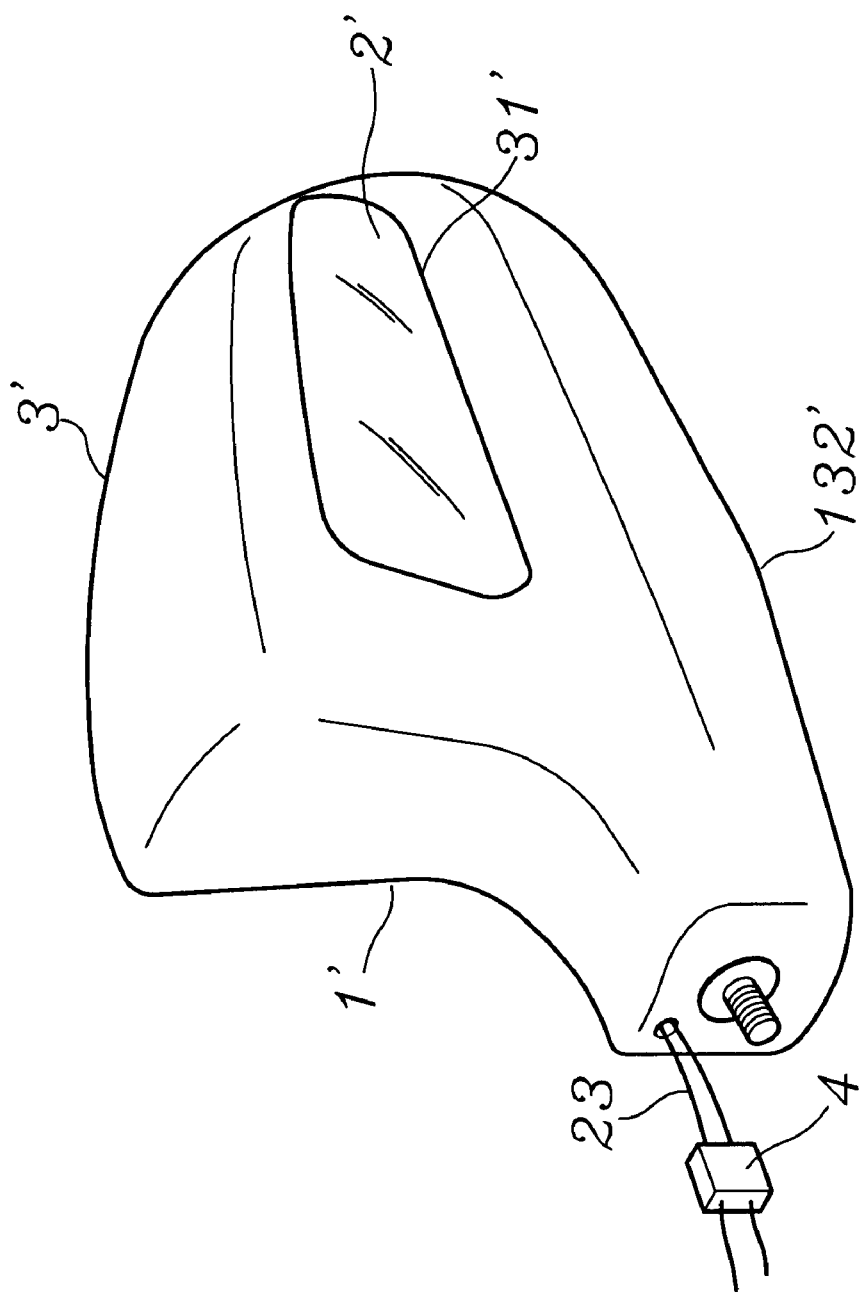

REAR VISION MIRROR WITH COLD LIGHT DIRECTION SIGNAL INDICATOR

FIELD OF THE INVENTION

The present invention relates to a rear vision mirror with a cold light direction signal indicator, wherein a rear vision mirror, a cold light direction signal indicator, and a protecting cover are combined.

BACKGROUND OF THE INVENTION

In the prior art, as shown in FIGS. 1A and 1B, an assembled device with a car direction light and a rear vision mirror is known. This prior art device includes a rear vision mirror 1a and a hollow case 3a combined with the rear vision mirror 1a and made of transparent material. A direction light 4a is installed within the hollow case 3a. However, the prior art design has many defects, such as the direction light 4a using bulbs 4a which will be dazzlingly bright. Moreover, the position of the rear vision mirror 1a is far away from the driver, thus the driver cannot clearly see the car behind. The direction light 4a is only visible to the driver in a front coming car, while the driver in the rear lateral side cannot see the direction light. No alert is performed. Besides, in general, the direction light 5a is installed at a lower side of the car head 6a (or at distal end of a car). The driver must lower his (or her) visual angle and shift the attention for viewing the flash of the direction light 5a. As the lateral coming cars are in parallel with the user's car (for example, a bus driver), the bus driver cannot see the flash of the direction light 4a of another car, even if he (or she) can see the rear vision mirror of another car. Thus, the bus driver cannot judge the right turning or left turning of the car. Therefore, the two vehicles could possibly collide with one another.

Therefore, there is an eager demand for a novel design of rear vision mirror with a cold light direction indicator for improving the aforesaid defects in prior art.

SUMMARY OF THE INVENTION

Accordingly, the primary object of the present invention is to provide a rear vision mirror with a cold light direction indicator comprising a rear vision mirror, a cold light direction indicator and a protecting cover. Therefore, an action of the cold light direction indicator can be viewed in a horizontal direction by drivers at front, lateral, or lateral rear sides, light from the cold light direction indicator is soft and almost no power is consumed. No flash light affecting human eyes emits.

The various objects and advantages of the present invention will be more readily understood from the following detailed description when read in conjunction with the appended drawing.

BRIEF DESCRIPTION OF THE DRAWINGS

FIG. 1A is a plane schematic view of a prior art.

FIG. 3B is an assembled perspective view of the second embodiment according to the present invention.

DETAILED DESCRIPTION OF THE PREFERRED EMBODIMENTS

Figure 1B:
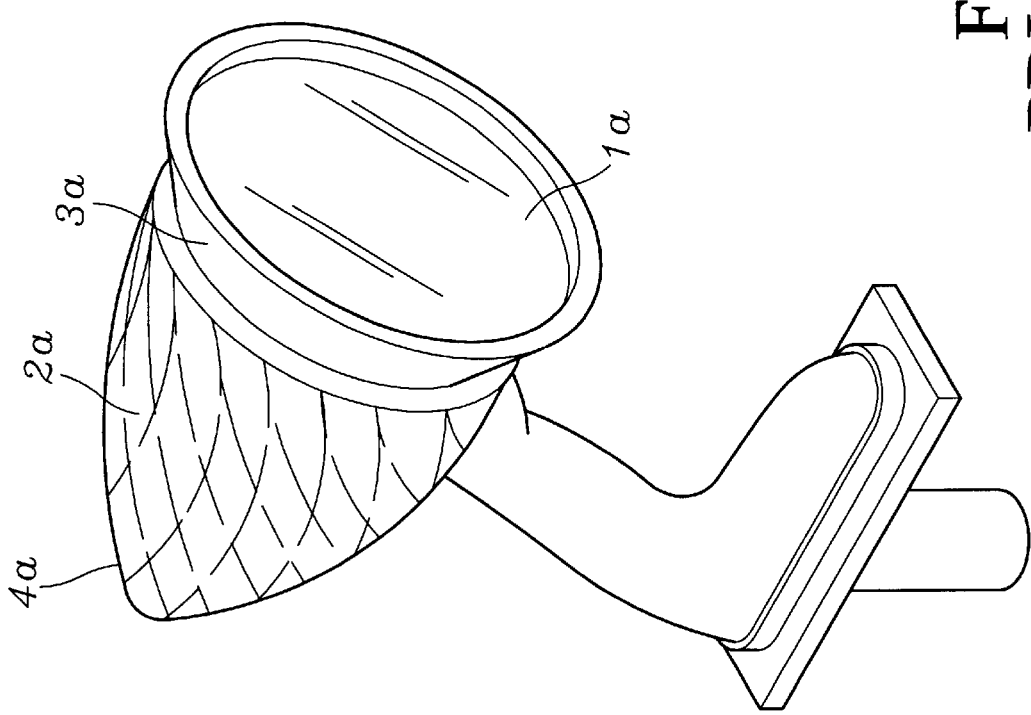
FIG. 1B is a schematic perspective view of a prior art.
Figure 2A:
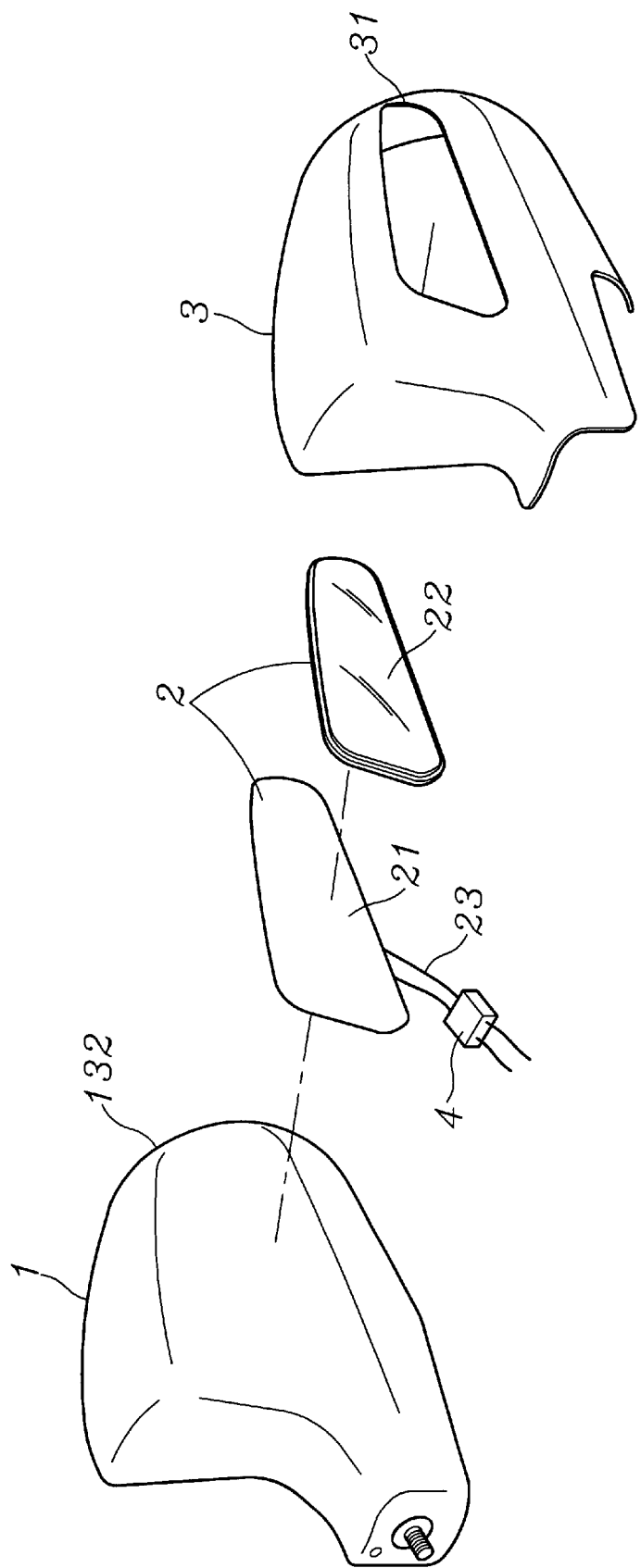
FIG. 2A is an exploded perspective view of the first embodiment according to the present invention.
Figure 2B:
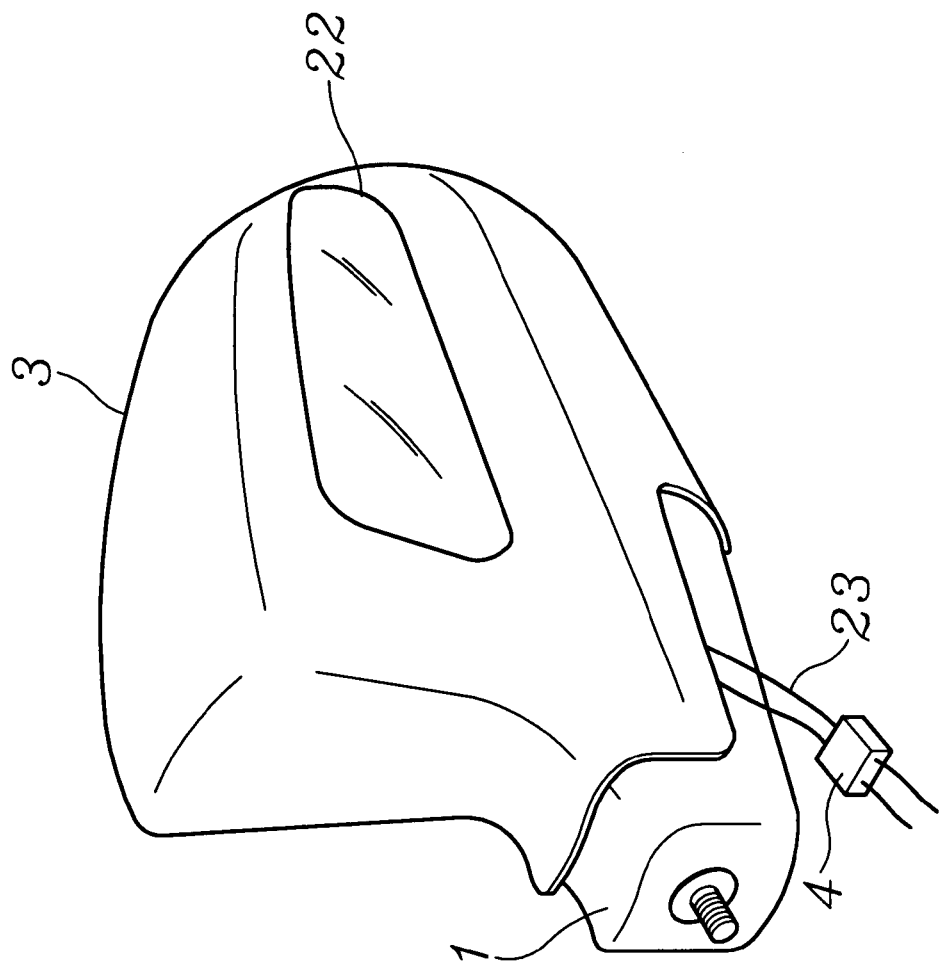
FIG. 2B is an assembled perspective view of the first embodiment according to the present invention.
Figure 2C:
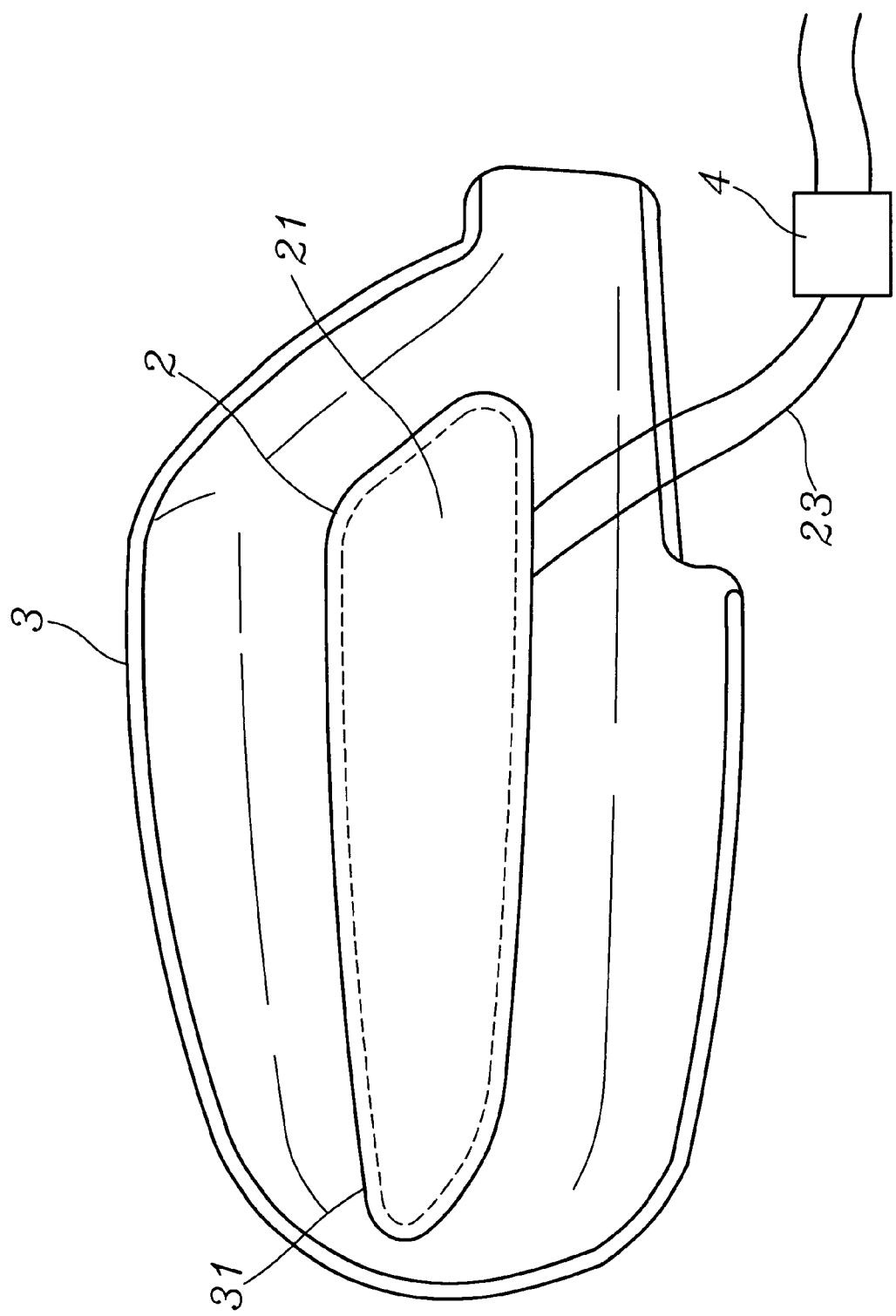
FIG. 2C is an inner assembled view of the first embodiment according to the present invention.
Figure 2D:
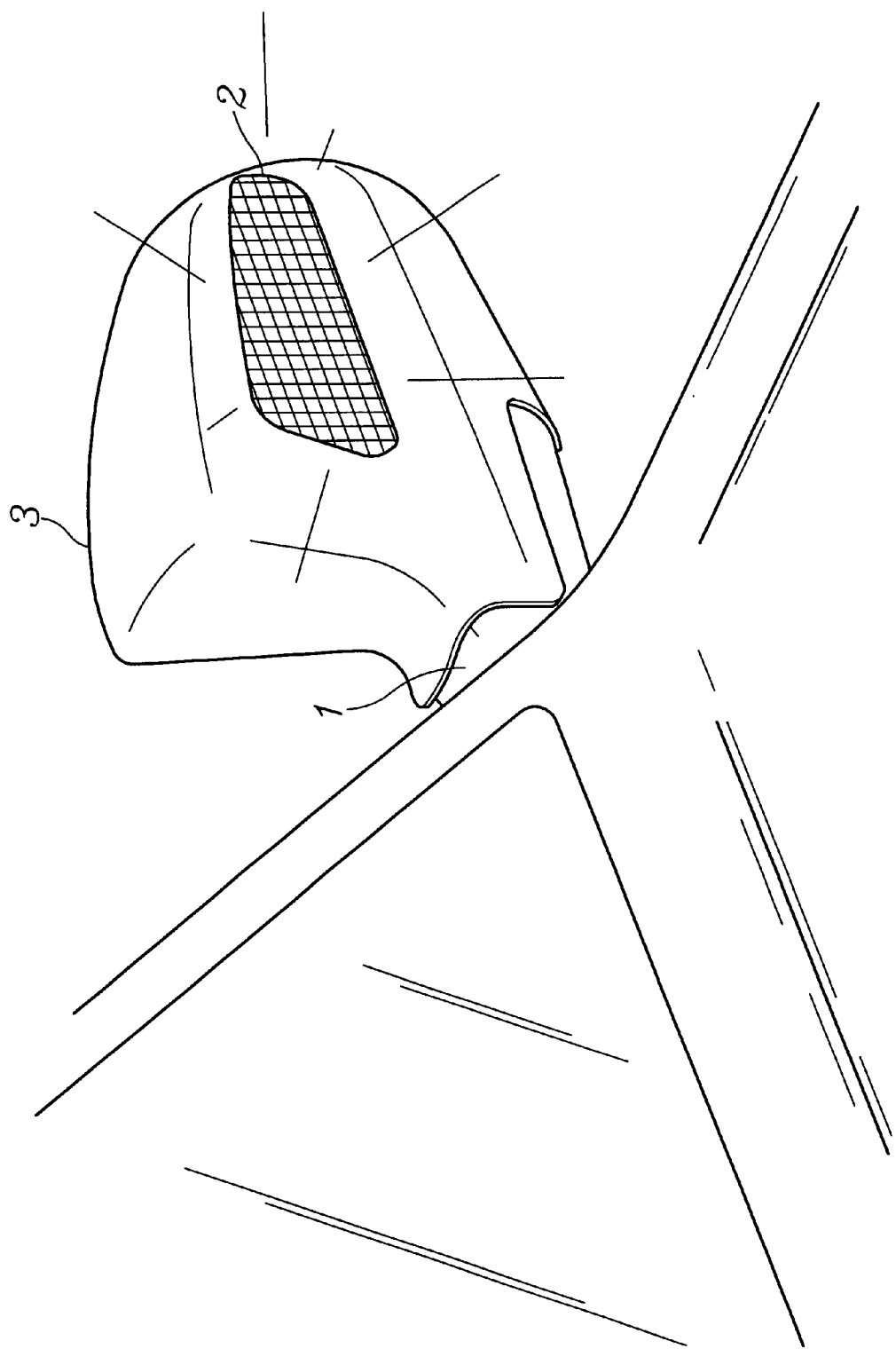
FIG. 2D shows an embodiment illustrating that the present invention is installed to a car.

With reference to FIGS. 2A, 2B, 2C, and 2D, an exploded perspective view, an assembled view, and an application that the present invention is installed to a car of one embodiment according to the present invention is illustrated. In one embodiment of the present invention, a rear vision mirror with a cold light direction indicator is illustrated. The present invention includes a rear vision mirror 1, a cold light direction—or direction signal—indicator 2, and a protecting cover 3. The rear vision mirror 1 has a case 132 with a reflector 131, which is firmly secured to a proper position of a car. The cold light direction indicator 2 is firmly secured to the surface of the case 132 of the rear vision mirror 131, includes a cold light piece 21 and a transparent casing 22, and is electrically connected to a power source and control device 4. The protecting cover 3 covers on the surface of the case 132 of the rear vision mirror 1 and cause the inner cold light direction indicator 2 to expose outwards by at least one via hole 31 installed on the protecting cover 3. Therefore, once the cold light direction indicator 2 acts, the drivers in front, lateral, and lateral rear sides will identify in a horizontal visual angle. The present invention emits a soft light, consumes almost no power, and does not flare light to affect human eyes.

Figure 3A:
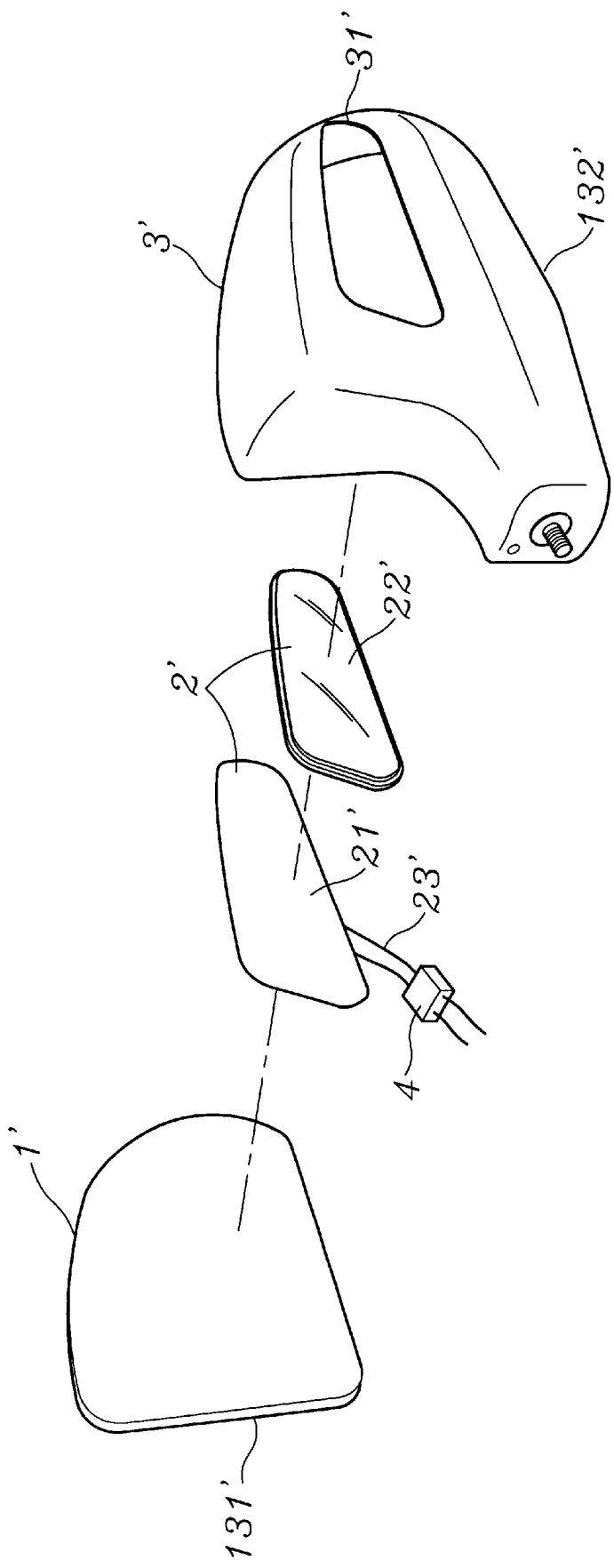
FIG. 3A is a schematic perspective view of the second embodiment according to the present invention.
Figure 4A:
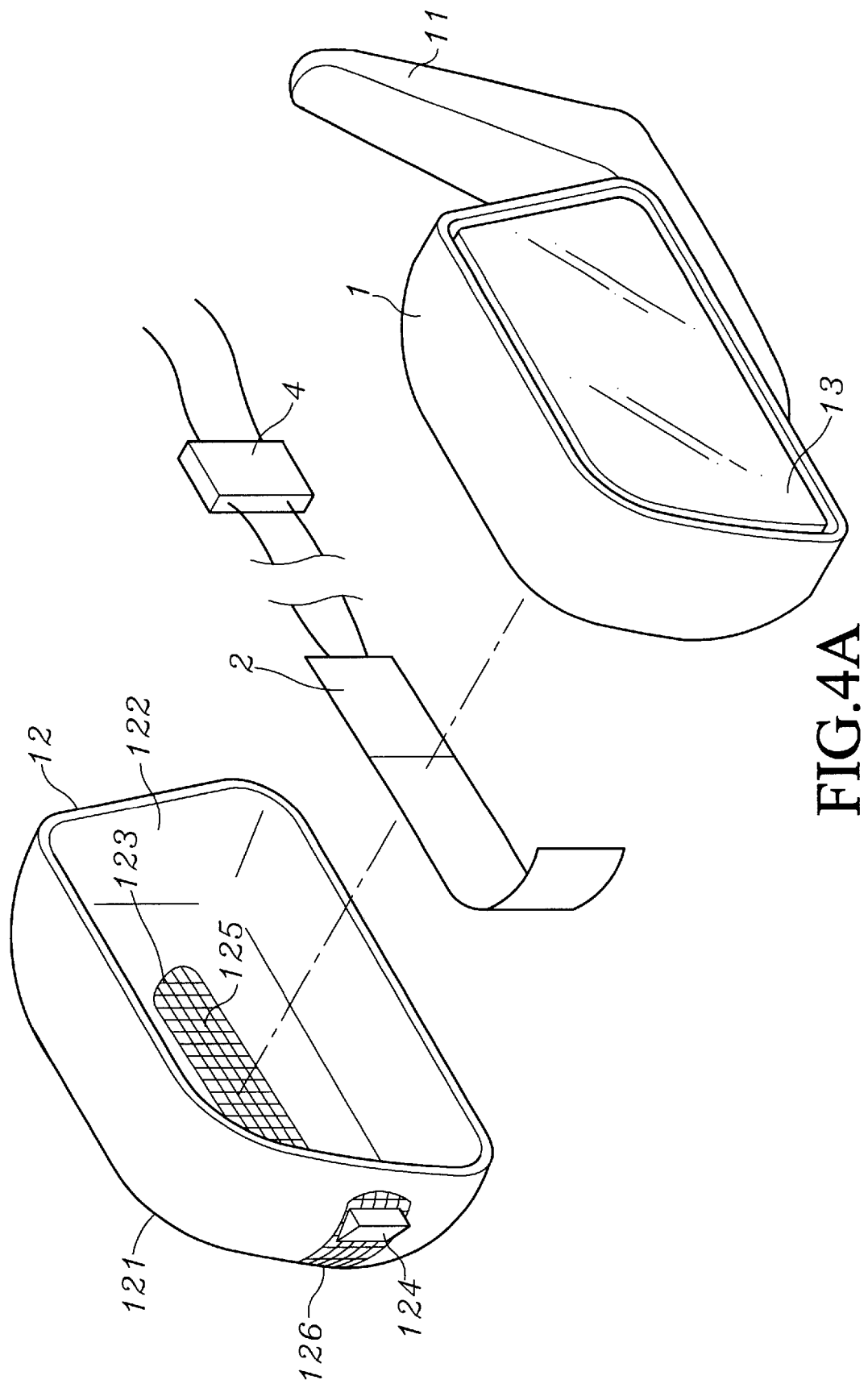
FIG. 4A is an exploded perspective view of the third embodiment according to the present invention.
Figure 4B:
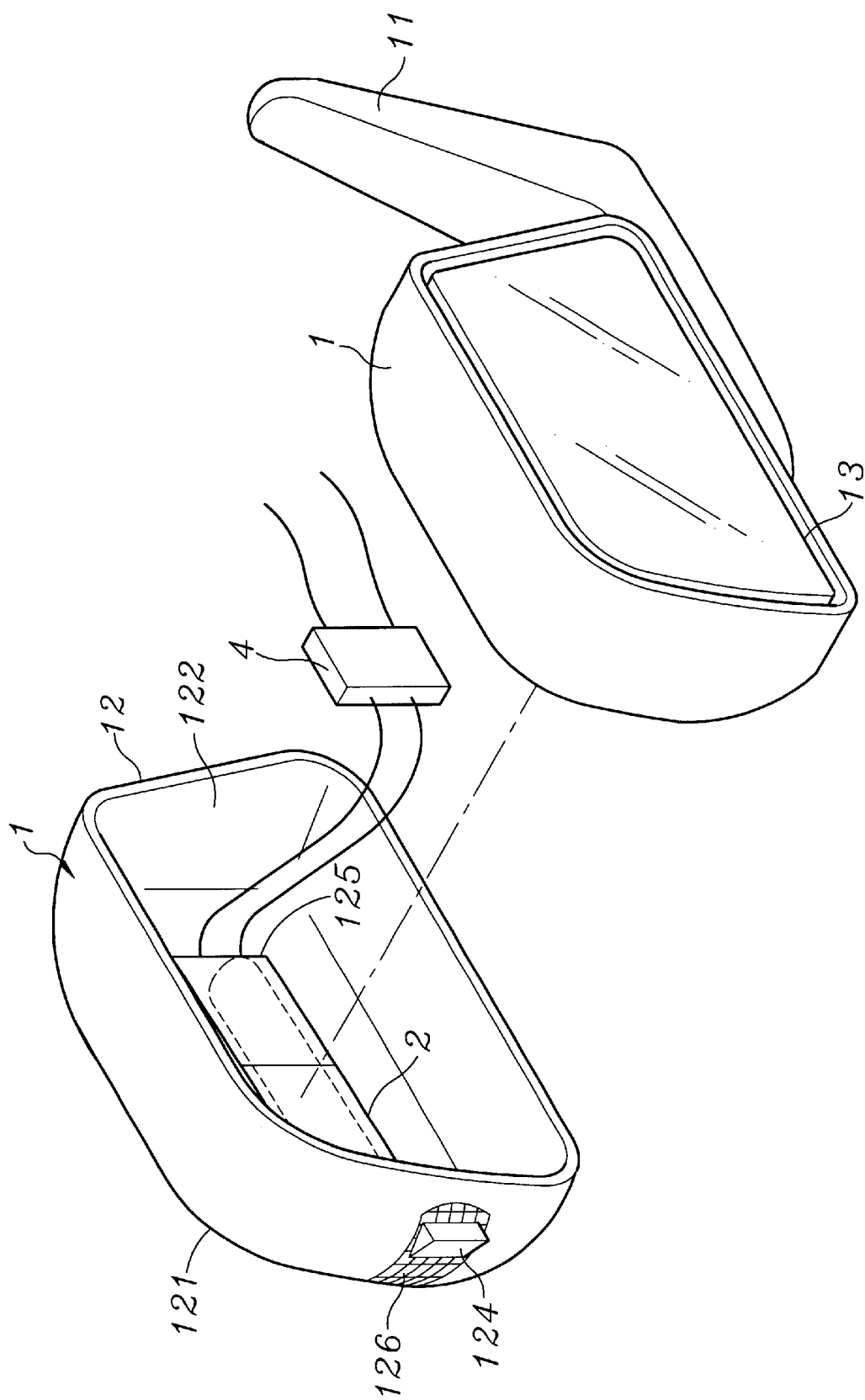
FIG. 4B is an assembled perspective view of the third embodiment according to the present invention.
Figure 4C:
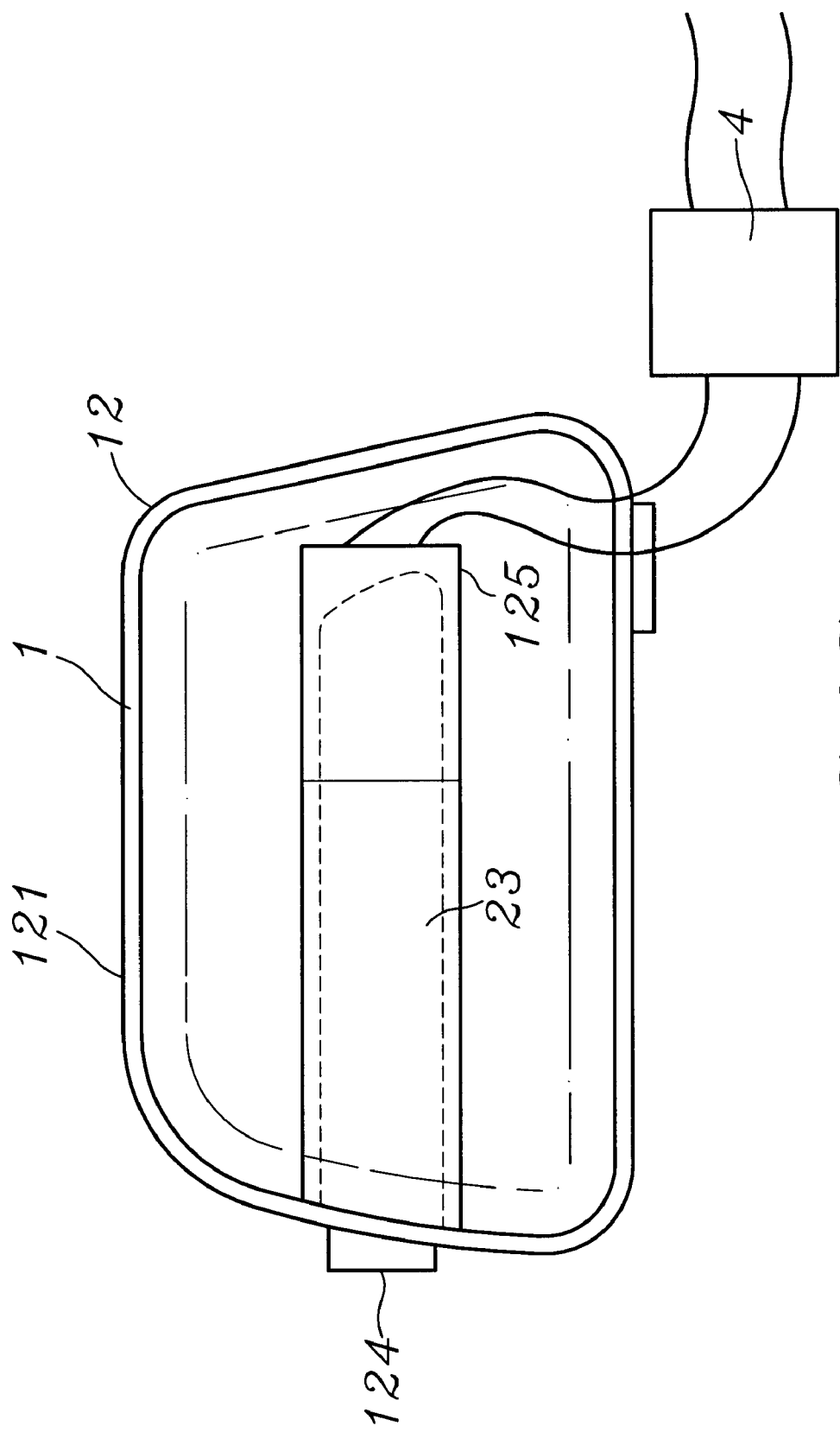
FIG. 4C is an inner assembled view of the third embodiment according to the present invention.
Figure 4D:
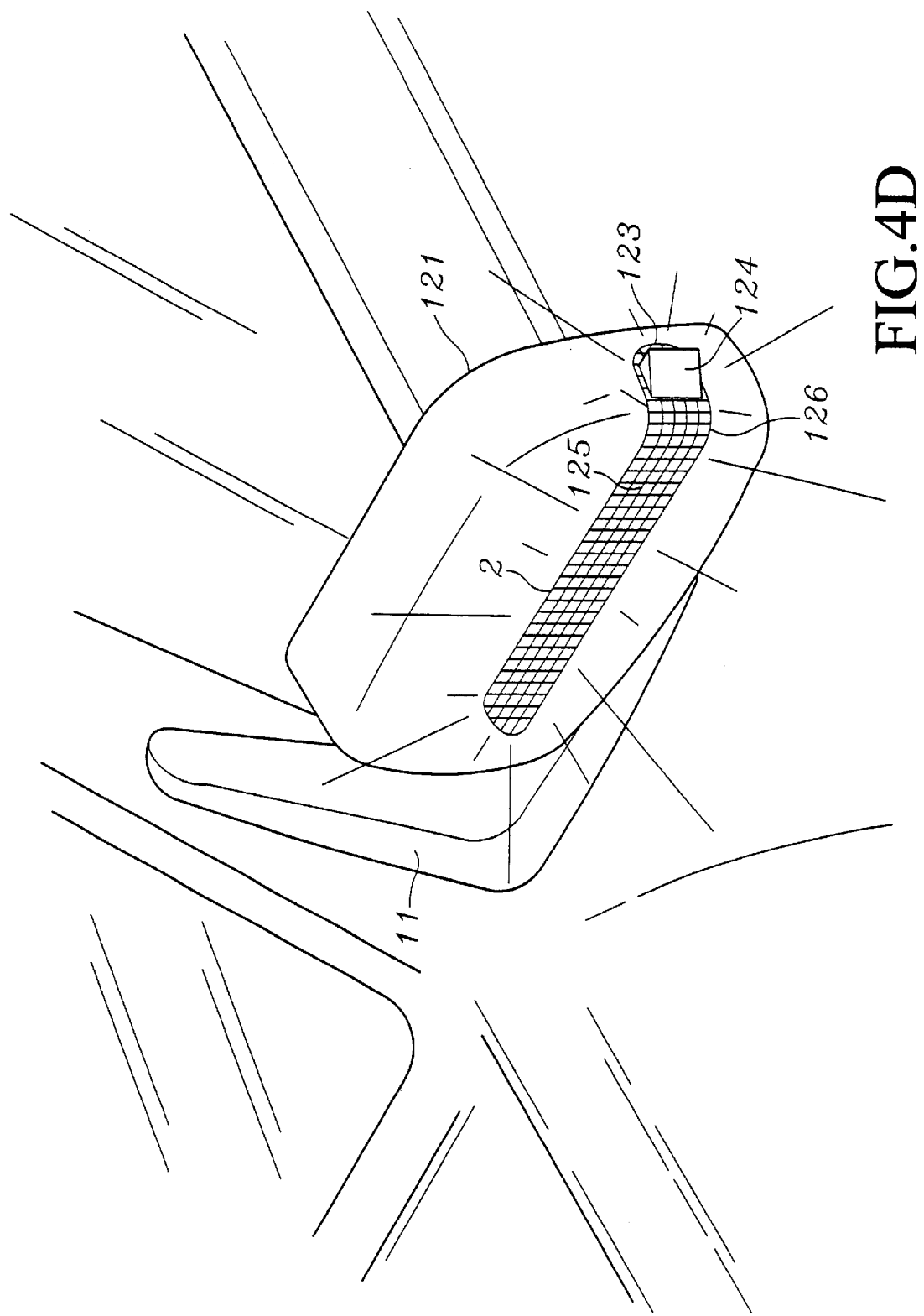
FIG. 4D shows an embodiment showing that the present invention is installed to a car.

Moreover, as shown in FIGS. 3A and 3B, the exploded perspective view and assembled perspective view of the present invention are illustrated. In the second embodiment of the present invention, a rear vision mirror with a cold light direction indicator is provided, which includes a protecting cover 3', a cold light direction indicator 2', and a rear vision mirror 1'. The protecting cover 3' is a case 132' for being screwed to a car, and one end thereof is installed with a rear vision mirror 1', and at least one via hole 31' is installed. The cold light direction indicator 2' is installed to a via hole 31' at the inner surface of the protecting cover 3'. The cold light direction indicator includes a cold light piece 21' and a transparent casing 22'. The rear vision mirror 1' has a thin reflector 131'.

With reference to FIGS. 4A to 4D, an exploded perspective view, an assembling perspective view, an inner assembled view and an application that the present invention is installed to a car of third embodiment according to the present invention is illustrated. In this embodiment of the present invention, a rear vision mirror with a cold light direction indicator is illustrated. The present invention includes a rear vision mirror 1 and a cold light direction indicator 2.

The rear vision mirror 1 comprises a linkage 11, a cold light casing 12 and a reflector body 13. The linkage 11 has a L shape, one end of which is firmly secured to a proper position out of a car, such as outsides of car doors beside the driver seat or two sides of the front cover of a car. The mirror case 12 is a rectangular box, one end thereof is formed as a cambered surface 121, while another end is formed with an opening 122. One side thereof is pivotally installed to another end of the linkage 11. One end of the cold light casing 12 is installed with a through hole 123 with a proper size. The through hole 123 may extend to another side of the cold light casing 12. A transparent block 124 is arranged at another side. A transparent piece 125 fills in the through hole 123. The surface of the transparent piece 125 is formed with multiple banks of tapered reflectors 126 with lattice shape. The reflector body 13 is embedded to another end of the cold light casing 12.

The cold light direction indicator 2 is adhered to the inner surface of the transparent piece 125, and can be made integrally to the transparent piece 125. The cold light direction indicator 2 is formed by an illumination portion 22 and a flash portion 23. The illumination portion 22 is thinner for providing the function of a night small light. The flash portion 23 is wider for providing a flash function as a car turns direction. The cold light direction indicator 2 can be extended to be adhered to the transparent block 124, and may be a triangular cylinder for being identified by a driver at rear side. Moreover, it can be connected to the power source and control device 3 through an extending electric wire 21 for flashing in a proper time. The cold light direction indicator 2 may be further connected in parallel to a direction ring (not shown) for matching the driver's action.

The present invention has the following advantages:

1. The rear vision mirror and cold light direction indicator used in a car are assembled.
2. The action of the cold light direction indicator can be identified rapidly horizontally by drivers at front, lateral and lateral rear sides.
3. The light of the present invention is soft and thus no flash emits to affect the judgement of drivers.
4. Almost no power is consumed.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A combined rear vision mirror and direction signal apparatus comprising:
   (a) a rear vision mirror assembly having a reflector body disposed at a first of opposed first and second sides thereof;
   (b) a cold light casing coupled to said second side of said rear vision mirror assembly, said cold light casing having an end surface portion and a side surface portion extending transversely therefrom, said cold light casing having formed therein a through hole extending through at least a portion of both said end and side surface portions;
   (c) a transparent piece engaging said through hole of said cold light casing to extend thereacross;
   (d) a transparent block having a triangular prismatic contour disposed at said side surface portion of said cold light casing;
   (e) a cold light direction signal indicator disposed between said transparent piece and said rear vision mirror assembly; and,
   (f) a power source and control device electrically coupled to said cold light direction signal indicator for energizing said cold light direction signal indicator in controlled manner.

2. The apparatus as recited in claim 1 wherein said cold light direction signal indicator extends along said transparent piece into said portion of said through hole formed through said side surface portion of said cold light casing, whereby at least a portion of said cold light direction signal indicator is visible from points laterally and rearwardly offset from said apparatus.

3. A combined rear vision mirror and direction signal apparatus comprising:
   (a) a rear vision mirror assembly having a reflector body disposed at a first of opposed first and second sides thereof;
   (b) a cold light casing coupled to said second side of said rear vision mirror assembly, said cold light casing having an end surface portion and a side surface portion extending transversely therefrom, said cold light casing having formed therein a through hole extending through at least a portion of both said end and side surface portions;
   (c) a transparent piece engaging said through hole of said cold light casing to extend thereacross;
   (d) a cold light direction signal indicator disposed between said transparent piece and said rear vision mirror assembly, said cold light direction signal indicator having defined thereon separately actuable illumination and flash portions, said illumination portion being less in a dimensional extent than said flash portion; and,
   (e) a power source and control device electrically coupled to said cold light direction signal indicator for energizing said cold light direction signal indicator in controlled manner.

4. A combined rear vision mirror and direction signal apparatus comprising:
   (a) a rear vision mirror assembly having a reflector body disposed at a first of opposed first and second sides thereof;
   (b) a protecting cover coupled to said second side of said rear vision mirror assembly, said protective cover having an end surface portion and a side surface portion extending transversely therefrom, said protecting cover having formed therein a through hole extending through at least a portion of both said end and side surface portions;
   (c) a cold light direction signal indicator disposed between said protecting cover and said rear vision mirror assembly to be at least partially visible through said through hole, said cold light direction signal indicator including at least one electroluminescent device defining separately actuable illumination and flash portions; and,
   (e) a power source and control device electrically coupled to said cold light direction signal indicator for energizing said electroluminescent device in controlled manner.

5. The apparatus as recited in claim 4 wherein said rear vision mirror assembly is an external automobile rear vision mirror assembly.

6. The apparatus as recited in claim 4 further comprising a transparent casing engaging said through hole of said protecting cover to extend thereacross.

7. The apparatus as recited in claim 6 further comprising a substantially L-shaped linkage pivotally supporting said rear vision mirror assembly.

8. The apparatus as recited in claim 6 wherein said protecting cover is formed to define a generally rectangular and hollow configuration having an open end receiving therethrough said rear vision mirror assembly.

9. The apparatus as recited in claim 8 wherein said end surface of said protecting cover is formed with a cambered contour.

10. The apparatus as recited in claim 6 wherein said transparent piece has formed thereon a plurality of separately delineated reflectors of respectively predetermined configurations defining a reflector lattice.

11. The apparatus as recited in claim 6 wherein said cold light direction signal indicator is connected to a directional signal circuit of an automobile.

12. The apparatus as recited in claim 6 wherein said cold light direction signal indicator is formed integrally with said transparent piece.

* * * * *